(12) United States Patent
Wakisaka et al.

(10) Patent No.: US 7,864,658 B2
(45) Date of Patent: Jan. 4, 2011

(54) MULTICARRIER COMMUNICATION METHOD AND SYSTEM, AND COMMUNICATION APPARATUS INCORPORATED THEREIN

(75) Inventors: Toshiyuki Wakisaka, Iizuka (JP); Masahiro Maki, Kasuya-Gun (JP); Hisao Koga, Chikushi-Gun (JP); Yuji Igata, Chikushino (JP); Fumio Ichihara, Chikushi-Gun (JP); Akihiro Yamashita, Miyaki-Gun (JP); Tsunehiro Hanada, Fukuoka (JP); Mutsuhiko Oishi, Iizuka (JP)

(73) Assignee: Panasonic Corporation, Osaka (JP)

( * ) Notice: Subject to any disclaimer, the term of this patent is extended or adjusted under 35 U.S.C. 154(b) by 1877 days.

(21) Appl. No.: 10/939,339

(22) Filed: Sep. 14, 2004

(65) Prior Publication Data

US 2005/0078803 A1    Apr. 14, 2005

(30) Foreign Application Priority Data

Sep. 19, 2003    (JP) .............................. 2003-328624

(51) Int. Cl.
*H04J 11/00*    (2006.01)
(52) U.S. Cl. ......................... 370/203; 370/241; 370/437
(58) Field of Classification Search ........................ None
See application file for complete search history.

(56) References Cited

U.S. PATENT DOCUMENTS 5,832,387 A     11/1998  Bae et al.
5,970,139 A  *  10/1999  Koenig et al. ................ 379/413
5,991,269 A  *  11/1999  Williamson et al. ......... 370/241

(Continued)

FOREIGN PATENT DOCUMENTS

EP          1 133 092          9/2001

(Continued)

OTHER PUBLICATIONS

Tomoaki Yoshiki et al., "A study on Subcarrier Adaptive Modulation System using Multilevel Transmission Power Control for OFDM/FDD System", Institute of Electronics, Information and Communication Engineers, Mar. 7, 2000, p. 400, B-5-15 (along with partial English translation).

(Continued)

*Primary Examiner*—Chi H Pham
*Assistant Examiner*—Mohammad S Adhami
(74) *Attorney, Agent, or Firm*—Wenderoth, Lind & Ponack, L.L.P.

(57) ABSTRACT

A multicarrier communication method selects carriers on the basis of an SN-ratio and the balancing of a transmission line. Available carriers are selected in accordance with the balancing of the balanced transmission line, in which the balancing is measured at either a sending terminal or a receiving terminal or alternatively at both, and the SN-ratio is measured between the sending terminal and the receiving terminal. Additionally, a modulation method having the greatest permissible multivalue is selected for each of the carriers, wherein the carriers are selected in light of the SN-ratio and balancing, or alternatively in a highest-to-lowest order of frequency. Transmission power is controlled for each of the carriers to suppress radiated emission, and the SN-ratio and balancing are measured at predetermined time intervals to renew the selection of the carriers and the selection of the modulation methods.

29 Claims, 5 Drawing Sheets

U.S. PATENT DOCUMENTS

| | | | |
|---|---|---|---|
| 6,442,129 | B1 | 8/2002 | Yonge, III et al. |
| 7,116,760 | B2 * | 10/2006 | Smith et al. .............. 379/22.02 |
| 2002/0147017 | A1 | 10/2002 | Li et al. |

FOREIGN PATENT DOCUMENTS

| | | |
|---|---|---|
| JP | 3-265314 | 11/1991 |
| JP | 2000-332723 | 11/2000 |
| JP | 2001-274748 | 10/2001 |
| JP | 3480710 | 10/2001 |
| JP | 2001-320306 | 11/2001 |
| JP | 2002-280935 | 9/2002 |
| JP | 2002-319919 | 10/2002 |
| JP | 2002-344417 | 11/2002 |
| JP | 2002-374190 | 12/2002 |

OTHER PUBLICATIONS

Yuuhei Hashimoto et al., "Peak Power Reduction for OFDM with Subcarrier Transmit Power Control Scheme", The Institute of Electronics, Information and Communication Engineers, Technical Report of IEICE, RCS2002-159 (Aug. 2002), Aug. 23, 2002, vol. 102, No. 282, pp. 77-82 (along with English abstract).

Mahbub Rashid A.K.M. et al., "Transmission Characteristics of Power Line Considering High-Speed PLC and its Immunity Characteristics", The Institute of Electronics, Information and Communication Engineers, Technical Report of IEICE, EMCJ2002-15 (May 2002), May 17, 2002, vol. 102, No. 85, pp. 49-54 (along with English abstract).

Yoshifumi Shimoshio et al., "Characteristics of Unbalance about Earth and their Calculation Method for Balanced Cable with Partial Unbalance at Arbitrary Positions on it", The Institute of Electronics, Information and Communication Engineers, B-II, Sep. 1998, vol. J81-BII, No. 9, pp. 883-891 (along with partial English translation).

Andreas Czylwik, "Adaptive OFDM for wideband radio channels", Global Telecommunications Conference, 1996, Globecom '96, Communications: The Key to Global Prosperity London, UK Nov. 18-22, 1996, New York, NY, USA, IEEE, US vol. 1, Nov. 18, 1996, pp. 713-718.

Cheong Yui Wong et al., "Multiuser OFDM with Adaptive Subcarrier, Bit, and Power Allocation", IEEE Journal on Selected Areas in Communications, IEEE Inc., New York, US, vol. 17, No. 10, Oct. 1999, pp. 1747-1758.

* cited by examiner

MULTICARRIER COMMUNICATION METHOD AND SYSTEM, AND COMMUNICATION APPARATUS INCORPORATED THEREIN

BACKGROUND OF THE INVENTION

1. Field of the Invention

The present invention relates to a multicarrier communication method and system using a balanced transmission line such as a power line, and a communication apparatus incorporated therein.

2. Description of the Related Art

With the rapid evolution of intelligent home appliances, attention has been directed to power-line communications (hereinafter simply called a "PLC") that allow existing power lines to be used as transmission lines, without wiring new cables, in order to control the intelligent home appliances in each household.

In a wideband PLC system having expectation of its further development in the near future, a multicarrier system such as OFDM (Orthogonal Frequency Division Multiplexing) is predominantly employed as a PLC-modulating method. According to the multicarrier system, a so-called channel estimation method (a channel-evaluating method) has been developed to realize high-speed transmission. The channel estimation method sets a modulation method for each carrier to use only carriers having a smaller bit error rate, not carriers having a greater one.

Figure 8:
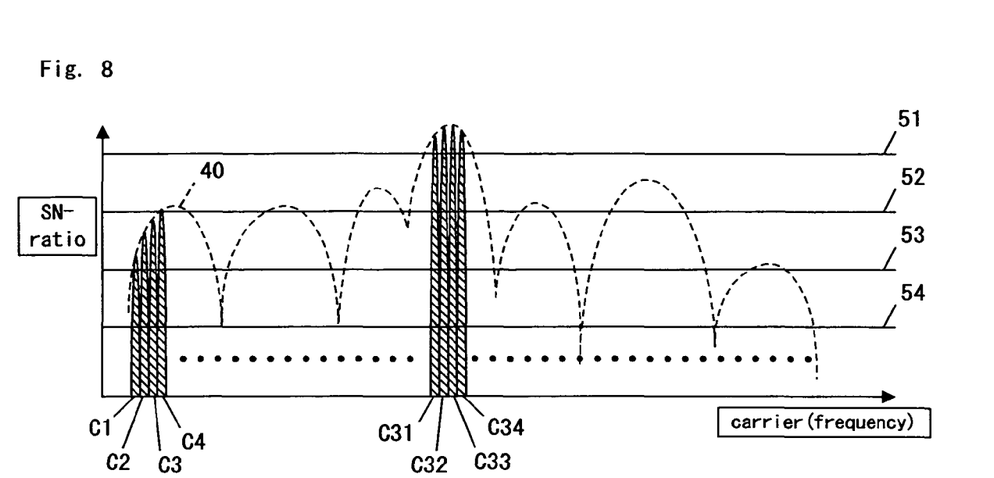
FIG. 8 is a descriptive illustration showing a prior art channel estimation method.

The following discusses the prior art with reference to FIG. 8. FIG. 8 is a descriptive illustration showing a prior art channel estimation method. In FIG. 8, the horizontal axis denotes a frequency axis illustrating a position of each carrier, while the vertical axis denotes an SN-ratio of each of the carriers between transmission and reception. An SN-ratio envelope 40 in FIG. 8 interconnects SN-ratios of the carriers. In the SN-ratio envelope 40, a greater distance from the horizontal axis provides a better SN-ratio of each corresponding carrier.

In FIG. 8, 64QAM-threshold 51 denotes a minimum SN-ratio required to employ a 64QAM-modulation method (QAM is an abbreviation of quadrature amplitude modulation). 16QAM-threshold 52 denotes a minimum SN-ratio required to employ a 16QAM-modulation method. QPSK-threshold 53 denotes a minimum SN-ratio required to employ a QPSK-modulation method (a quadrature phase modulation method). BPSK-threshold 54 denotes a minimum SN-ratio required to employ a BPSK-modulation method (a binary phase shift keying modulation method).

In each of the above methods, the addition of proper error-correcting bits makes it feasible to correct data errors that have occurred in transmission lines, when each SN-ratio is equal or greater than its predetermined threshold. Each of the thresholds according to the modulation methods usually has an SN-ratio difference of some 6 dB.

The modulation methods have multivalues rendered greater in the order of the 64QAM-, 16QAM-, QPSK-, and BPSK-modulation methods. As a result, information transmittable per unit time is made greater in amount in the same order. At the same time, SN-ratios made greater in the same order are required.

The prior art channel estimation method selects a modulation method having a greater multivalue permitted by an SN-ratio of each of the carriers, and consequently transmits information more efficiently when viewed as a whole.

For example, each of carriers C1, C2, and C3 in FIG. 8 has an SN-ratio equal to or greater than QPSK-threshold 53 but less than 16QAM-threshold 52. Assuming that each of the carriers C1, C2, and C3 employs the 16QAM-modulation method, there is an increased possibility that non-correctable errors in data might occur because of an insufficient SN-ratio of each of these carriers. Accordingly, each of the above carriers selects the QPSK-modulation method in which its SN-ratio is sufficient. Carrier C4 has an SN-ratio greater than the 16QAM-threshold 52, but less than the 64QAM-threshold 51, and accordingly selects the 16QAM-modulation method. Similarly, carriers C31 to C34 select the 64QAM-modulation method.

There is another prior art of realizing a high-efficient multicarrier transmission method, which is now described below with reference to FIG. 8.

As discussed above, the carriers C1, C2, and C3 in FIG. 8 select the QPSK-modulation method, while the carrier C4 selects the 16QAM-modulation method. Each of the carriers C2, C3 has an SN-ratio considerably greater than the QPSK-threshold 53. This means that the carriers C2, C3 can be reduced in transmission power to a degree where their SN-ratios slightly exceed the QPSK-threshold 53. An amount of the reduction in transmission power may be imparted to the carrier C4 in order to increase the transmission power of the carrier C4 by a corresponding amount. As a result, the carrier C4 has an SN-ratio greater than the 64QAM-threshold 51, and is possible to select the 64QAM-modulation method having a greater multivalue.

In short, the transmission carrier power control method is an art of transmitting information with improved efficiency by controlling the transmission power of each of the carriers under the condition that the entire transmission power is constant.

The prior art channel estimation method and transmission carrier power control method are characterized in that the carriers are selected in accordance with only their SN-ratios. However, the PLC has particularity in which indoor power lines are used as transmission lines, and consequently has a problem of transmission power leakage or unwanted radiated emission caused by the above particularity. This is a more serious issue to a high-frequency band PLC that is expected to evolve in the future. Therefore, in the multicarrier system, the carriers must be selected in light of the suppression of the unwanted radiated emission as well as the SN-ratios.

[Patent reference No. 1]: published Japanese Patent Application Laid-Open No. (HEI) 3-265314

[Patent reference No. 2]: published Japanese Patent Application Laid-Open No. 2000-332723

[Patent reference No. 3]: published Japanese Patent Application Laid-Open No. 2001-274748

[Patent reference No. 4]: published Japanese Patent Application Laid-Open No. 2001-320306

[Patent reference No. 5]: published Japanese Patent Application Laid-Open No. 2002-280935

SUMMARY OF THE INVENTION

In view of the above, an object of the present invention is to provide a multicarrier communication method and system and an art related thereto, in which the multicarrier communication method and system is operable, in multicarrier communication using a balanced transmission line such as a power line, to select a greater number of carriers and a greater number of modulation methods having greater multivalues, and to suppress unwanted radiated emission, in light of an SN-ratio and balancing of the transmission line.

A first aspect of the present invention provides a multicarrier communication method using a balanced transmission line that interconnects sending terminal equipment and receiving terminal equipment, the multicarrier communication method comprising: measuring balancing of the balanced transmission line; and controlling a communication mode in accordance with measured balancing that has been obtained by the measuring the balancing of the balanced transmission line.

The above method achieves multicarrier communication operable to effect, in various manners, communication mode control such as selection of carriers to be used in communication, carrier power control, and modulation method selection on the basis of a measured value of the balancing of the balanced transmission line.

A second aspect of the present invention provides a multicarrier communication method using a balanced transmission line that interconnects sending terminal equipment and receiving terminal equipment, the multicarrier communication method comprising: measuring balancing and an SN-ratio of the balanced transmission line; and controlling a communication mode in accordance with measured balancing and a measured SN-ratio, the measured balancing and the measured SN-ratio having been obtained by the measuring.

The above method achieves multicarrier communication operable to effect, in various manners, communication mode control such as selection of carriers to be used in communication, carrier power control, and modulation method selection on the basis of measured values of the balancing and SN-ratio of the balanced transmission line.

A third aspect of the present invention provides a multicarrier communication method as defined in the first aspect, wherein the controlling the communication mode includes selecting carriers to be used in communication in accordance with the measured balancing that has been obtained by the measuring the balancing of the balanced transmission line.

The method as given above achieves multicarrier communication in which the carriers to be used are selected on the basis of a measured value of the balancing.

A fourth aspect of the present invention provides a multicarrier communication method as defined in the second aspect, wherein the controlling the communication mode includes selecting carriers to be used in communication in accordance with the measured balancing and the measured SN-ratio, the measured balancing and the measured SN-ratio having been obtained by the measuring the balancing and the SN-ratio of the balanced transmission line.

According to the method, it is possible to achieve multicarrier communication in which the carriers to be used are selected on the basis of measured values of the balancing and SN-ratio.

A fifth aspect of the present invention provides a multicarrier communication method as defined in the fourth aspect, wherein the controlling the communication mode includes excluding from communication, any carrier having an SN-ratio less than a predetermined reference value, in accordance with the measured SN-ratio that has been obtained by the measuring the balancing and the SN-ratio of the balanced transmission line.

Pursuant to the above method, any carrier apparently having a poor SN ratio and many errors in bits is excluded from communication. As a result, high-reliable multicarrier communication is achievable.

A sixth aspect of the present invention provides a multicarrier communication method as defined in the fourth aspect, wherein the controlling the communication mode includes selecting the carriers in highest-to-lowest order of frequency.

Pursuant to the above method, a greater number of high-frequency band carriers associated with low noises are selected, and a greater number of modulation methods having greater multivalues are employed. As a result, high-efficient transmission is realized.

A seventh aspect of the present invention provides a multicarrier communication method as defined in the third aspect, wherein the controlling the communication mode includes allowing the sending terminal equipment to select the carriers to be used in communication.

The above method achieves multicarrier communication in which the carriers to be used are selected in the sending terminal equipment.

An eighth aspect of the present invention provides a multicarrier communication method as defined in the fourth aspect, wherein the controlling the communication mode includes allowing the receiving terminal equipment to select the carriers to be used in communication, and to notify the sending terminal equipment of results from selection of the carriers.

Pursuant to the above method, the receiving terminal equipment selects the carriers to be used for communication, and then notifies the sending terminal equipment of results from the selection of the carriers; and the sending terminal equipment in receipt of the notification from the receiving terminal equipment determines available carriers on the basis of the results from the carrier selection. As a result, multicarrier communication is practicable.

A ninth aspect of the present invention provides a multicarrier communication method as defined in the fourth aspect, wherein the controlling the communication mode includes selecting a modulation method for each of the carriers in accordance with the measured SN-ratio that has been obtained by the measuring the balancing and the SN-ratio of the balanced transmission line.

The above method selects the carrier-selecting method on the basis of the SN-ratio, and invariably efficient multicarrier communication is achievable.

A tenth aspect of the present invention provides a multicarrier communication method as defined in the fourth aspect, wherein the measuring the balancing and the SN-ratio is performed at predetermined time intervals, and wherein the controlling the communication mode includes selecting new carriers to be used in communication each time when the measuring the balancing and the SN-ratio is performed.

The above method is possible to select the carriers in dependant upon moment-to-moment situations, in particular, in environment where noises occur to a frequently varying degree, as pronouncedly observed in household power lines. As a result, successful multicarrier communication invariably suited for installation environment is achievable.

An eleventh aspect of the present invention provides a multicarrier communication method as defined in the first aspect, wherein the controlling the communication mode includes controlling transmitting power for carriers to be used in communication in accordance with the measured balancing that has been obtained by the measuring the balancing of the balanced transmission line.

The above method allows transmission power for available carriers to be controlled, on the basis of the measured value of the balancing, in such a manner as to inhibit as much unwanted radiated emission as possible. As a result, environment-friendly multicarrier communication taking account of a reduction in unwanted radiated emission is realized.

A twelfth aspect of the present invention provides a multicarrier communication method as defined in the first aspect, wherein the controlling the communication mode includes decreasing transmitting power of a carrier exhibiting lowest balancing in the measuring the balancing of the balanced transmission line, or the controlling the communication mode includes excluding the carrier from communication. According to the method, it is possible to suppress unwanted radiated emission by decreasing transmission power for the lowest balancing carrier or excluding the carrier from communication.

A thirteenth aspect of the present invention provides a multicarrier communication method as defined in the second aspect, wherein the controlling the communication mode includes controlling transmitting power for carriers to be used in communication in accordance with the measured balancing and the measured SN-ratio, the measured balancing and the measured SN-ratio having been obtained by the measuring the balancing and the SN-ratio of the balanced transmission line.

The above method allows transmission power for available carriers to be controlled on the basis of the measured values of the balancing and SN-ratio in such a manner as to inhibit as much unwanted radiated emission as possible. As a result, environment-friendly and high-efficient multicarrier communication taking account of the SN-ratio and unwanted radiated emission is realized.

A fourteenth aspect of the present invention provides a multicarrier communication method as defined in the second aspect, wherein the controlling the communication mode includes practicing both selection of carriers to be used in communication and control over transmitting power for the carriers in accordance with the measured balancing and the measured SN-ratio, the measured balancing and the measured SN-ratio having been obtained by the measuring the balancing and the SN-ratio of the balanced transmission line.

The above method allows both of the selection of the carriers to be used and the control over transmission power for them to be practiced in accordance with the measured values of the SN-ratio and balancing. As a result, environment-friendly and high-reliable multicarrier communication is attainable.

A fifteenth aspect of the present invention provides a multicarrier communication method as defined in the thirteenth aspect, wherein the controlling the communication mode includes comparing the measured balancing and the measured SN-ratio, both of which have been obtained by the measuring the balancing and the SN-ratio of the balanced transmission line, with predetermined first and second reference values, respectively, the first reference value being a balancing-related reference value, the second reference value being an SN-ratio-related reference value, and wherein (a) a carrier having balancing equal to or greater than the first reference value and an SN-ratio equal to or greater than the second value reference is used without a change in transmitting power for the carrier; (b) a carrier having balancing equal to or greater than the first reference value and an SN-ratio less than the second value reference is used with an increase in transmitting power for the carrier or excluded from communication; (c) a carrier having balancing less than the first reference value and an SN-ratio equal to or greater than the second value reference is used with a decrease in transmitting power for the carrier; and (d) a carrier having balancing less than the first reference value and an SN-ratio less than the second value reference is excluded from communication.

A sixteenth aspect of the present invention provides a multicarrier communication method as defined in the fifteenth aspect, wherein the first reference value is determined in accordance with radiated emission in the balanced transmission line, and the second reference value is determined in accordance with a modulation method-based bit error rate.

The above methods provide fine control to suppress as much unwanted radiated emission as possible on the basis of measured values of the SN-ratio and balancing. As a result, environment-friendly and high-reliable multicarrier communication taking account of the SN-ratio and unwanted radiated emission is realized.

A seventeenth aspect of the present invention provides a multicarrier communication method as defined in the sixteenth aspect, wherein the controlling the communication mode includes collectively performing, for several carriers divided for each band, at least one of selection of the carriers and control over transmitting power for the carriers.

Pursuant to the above method, an available band is divided into sub-bands, each of which is, e.g., 1 Mz, thereby collectively controlling several carriers within the sub-bands. As a result, simple and high-efficient multicarrier communication is realized.

An eighteenth aspect of the present invention provides a multicarrier communication method as defined in the first aspect, wherein the measuring the balancing of the balanced transmission line includes allowing at least one of the sending terminal equipment and the receiving terminal equipment to measure the balancing.

Pursuant to the above method, the balancing is measured by either one of the sending terminal equipment and the receiving terminal equipment, which has lighter loads imposed thereon when both of the sending terminal equipment and the receiving terminal equipment are used. As a result, high-efficient multicarrier communication is attainable.

A nineteenth aspect of the present invention provides a multicarrier communication method as defined in the second aspect, wherein the measuring the balancing and the SN-ratio of the balanced transmission line includes allowing at least one of the sending terminal equipment and the receiving terminal equipment to measure the balancing, and allowing the receiving terminal equipment to measure the SN-ratio.

Pursuant to the above method, the balancing is measured by either one of the sending terminal equipment and the receiving terminal equipment, which has lighter loads imposed thereon when both of the sending terminal equipment and the receiving terminal equipment are used. As a result, the receiving terminal equipment that measures the SN-ratio is released in loads imposed thereon.

A twentieth aspect of the present invention provides a multicarrier communication method as defined in the first aspect, wherein the measuring the balancing of the balanced transmission line includes measuring at least one of longitudinal conversion loss and longitudinal conversion transfer loss as a parameter indicative of the balancing.

Pursuant to the above method, either the longitudinal conversion loss or the longitudinal conversion transfer loss is measured to estimate unwanted radiated emission from the balanced transmission line. As a result, high-efficient multicarrier communication is achievable, in which the unwanted radiated emission is suppressed based on a measured value of either the longitudinal conversion loss or the longitudinal conversion transfer loss.

A twenty-first aspect of the present invention provides a multicarrier communication apparatus operable to provide multicarrier communication between a first user's terminal and a second user's terminal through a balanced transmission line, the multicarrier communication apparatus comprising: a carrier-selecting unit operable to select carriers to be used in communication; a transmitter signal-modulating unit operable to transmit modulated carriers to the second user's terminal; a receiver signal-demodulating unit operable to receive signals from the second user's terminal; and a coupler unit connected to the balanced transmission line, wherein the carrier-selecting unit selects the carriers to be used in communication in accordance with at least one of balancing and an SN-ratio of the balanced transmission line.

Pursuant to the above construction, the carriers to be used for communication are selected on the basis of measured values of the balancing and SN-ratio of the balanced transmission line. As a result, a multicarrier communication apparatus taking simultaneous account of both of the SN-ratio and the suppression of unwanted radiated emission is achievable.

A twenty-second aspect of the present invention provides a multicarrier communication apparatus as defined in the twenty-first aspect, further comprising: a selection result-notifying unit operable to notify the second user's terminal of results from selection made by the carrier-selecting unit.

Pursuant to the above construction, for example, a receiving terminal permits the carrier-selecting unit to select the carriers to be used in communication, and then notifies a sending terminal of results from the selection, with the result that, in the sending terminal, carriers to be used in practice are determined on the basis of the notification from the receiving terminal.

A twenty-third aspect of the present invention provides a multicarrier communication apparatus as defined in the twenty-first aspect, further comprising: a balancing-measuring unit operable to measure the balancing of the balanced transmission line.

The above construction provides a multicarrier communication apparatus in which an SN-ratio-measuring unit measures the SN-ratio of the balanced transmission line, thereby rendering results from the measurement helpful in selecting the carriers.

A twenty-fourth aspect of the present invention provides a multicarrier communication apparatus as defined in the twenty-first aspect, further comprising: a balancing-measuring unit operable to measure the balancing of the balanced transmission line; and a balancing-notifying unit operable to notify the second user's terminal of a measured value of the balancing.

Pursuant to the above construction, for example, a multicarrier communication apparatus in the receiving terminal is possible to measures the balancing in the receiving terminal, and to notify the sending terminal of results from the measurement.

A twenty-fifth aspect of the present invention provides a multicarrier communication apparatus as defined in the twenty-first aspect, further comprising: a balancing-obtaining unit operable to obtain a measured value of the balancing notified by the second user's terminal.

The above construction provides a multicarrier communication apparatus in which, for example, the balancing-obtaining unit obtains the balancing measured by the receiving terminal, thereby rendering results therefrom helpful in selecting the carriers.

A twenty-sixth aspect of the present invention provides a multicarrier communication apparatus as defined in the twenty-first aspect, further comprising: an SN-ratio-measuring unit operable to measure the SN-ratio of the balanced transmission line.

The above construction provides a multicarrier communication apparatus in which the SN-ratio-measuring unit measures the SN-ratio of the balanced transmission line, thereby rendering results from the measurement helpful in selecting the carriers.

A twenty-seventh aspect of the present invention provides a multicarrier communication apparatus as defined in the twenty-first aspect, further comprising: an SN-ratio-measuring unit operable to measure the SN-ratio of the balanced transmission line; and an SN-ratio-notifying unit operable to notify the second user's terminal of a measured value of the SN-ratio.

Pursuant to the above construction, for example, a multicarrier communication apparatus in a receiving terminal is possible to measure the SN-ratio in the receiving terminal, and to notify a sending terminal of results from the measurement.

A twenty-seventh aspect of the present invention provides a multicarrier communication apparatus as defined in the twenty-first aspect, further comprising: an SN-ratio-obtaining unit operable to obtain a measured value of the SN-ratio notified by the second user's terminal.

The above construction provides a multicarrier communication apparatus in which, for example, the SN-ratio-measuring unit obtains an SN-ratio measured by the receiving terminal, thereby rendering results therefrom helpful in selecting both of the carriers and modulation methods.

A twenty-ninth aspect of the present invention provides a multicarrier communication apparatus as defined in the twenty-first aspect, further comprising: a selection result-obtaining unit operable to obtain results from carrier selection in the second user's terminal, and to select carries to be used for communication at the first user's terminal.

The above construction provides a multicarrier communication apparatus in which, for example, receiving terminal equipment practices SN-ratio measurement and carrier selection, thereby notifying sending terminal equipment of them; and in the sending terminal equipment, the selection result-obtaining unit in receipt of the notification selects the carriers to be used for communication.

A thirtieth aspect of the present invention provides a multicarrier communication apparatus as defined in the twenty-first aspect, further comprising: a modulation method-selecting unit operable to select an available modulation method for each of the carriers selected in accordance with the balancing and SN-ratio of the balanced transmission line.

Pursuant to the above construction, the invariably best modulation method to be applied to each of the carriers is selectable based on the SN-ratio and balancing of the balanced transmission line.

A thirty-first aspect of the present invention provides a multicarrier communication apparatus as defined in the twenty-first aspect, further comprising: an electrical power-setting unit operable to set transmission power for the carriers selected in accordance with the balancing and SN-ratio of the balanced transmission line.

Pursuant to the above, the transmission power applicable to the carriers is settable in view of the SN-ratio and balancing of the balanced transmission line. As a result, an environment-friendly and high-efficient multicarrier communication apparatus taking account of unwanted radiated emission is achievable.

A thirty-second aspect of the present invention provides a multicarrier communication apparatus as defined in the twenty-first aspect, wherein one of longitudinal conversion loss and longitudinal conversion transfer loss is employed as a parameter indicative of the balancing.

The above construction provides a high-efficient multicarrier communication apparatus in which either the longitudinal conversion loss or the longitudinal conversion transfer loss is measured to estimate unwanted radiated emission from the balanced transmission line, thereby suppressing the unwanted radiated emission in accordance with the estimation.

A thirty-third aspect of the present invention provides a modem operable to provide multicarrier communication between a first user's terminal and a second user's terminal through a balanced transmission line, the modem comprising: a measurement unit operable to measure both balancing and an SN-ratio of the balanced transmission line; a carrier-selecting unit operable to select carriers to be used in communication in accordance with the balancing and SN-ratio measured by the measurement unit; a transmitter signal-modulating unit operable to modulate the carriers selected by the carrier-selecting unit before transmitting the carriers to the second user's terminal; a receiver signal-demodulating unit operable to receive signals from the second user's terminal; and a coupler unit connected to the balanced transmission line.

The above structure provides a multicarrier communication-adapted modem operable to select the carriers to be used in communication and optimum modulation methods on the basis of measured values of the SN-ratio and balancing, and further to suppress unwanted radiated emission.

A thirty-fourth aspect of the present invention provides a multicarrier communication system using a balanced transmission line, the multicarrier communication system comprising: a measurement unit operable to measure both balancing and an SN-ratio of the balanced transmission line that interconnects sending terminal equipment and receiving terminal equipment; and a carrier-selecting unit operable to select carriers to be used in communication in accordance with the balancing and SN-ratio measured by the measurement unit.

The above structure provides a multicarrier communication system operable to select the carriers to be used in communication and optimum modulation methods on the basis of measured values of the SN-ratio and balancing, and further to suppress unwanted radiated emission.

A thirty-fifth aspect of the present invention provides a multicarrier communication system as defined in the thirty-fourth aspect, wherein one of longitudinal conversion loss and longitudinal conversion transfer loss is employed as a parameter indicative of the balancing.

The above construction provides a high-efficient multicarrier communication system in which either the longitudinal conversion loss or the longitudinal conversion transfer loss is measured to estimate unwanted radiated emission from the balanced transmission line, thereby suppressing the unwanted radiated emission in accordance with the estimation.

The above, and other objects, features and advantages of the present invention will become apparent from the following description read in conjunction with the accompanying drawings, in which like reference numerals designate the same elements.

DETAILED DESCRIPTION OF THE INVENTION

Embodiments of the present invention are now described with reference to the accompanying drawings. The embodiments illustrate as an exemplary balanced transmission line an interior-wired power line in a house or a building and describe multicarrier communication that employs the interior-wired power line.

Another exemplary balanced transmission line can be a twisted pair wire.

Prior to specific descriptions of the embodiments, an LCL (longitudinal conversion loss) is now described, which works as a parameter indicative of the balancing of the balanced transmission line.

Figure 1:
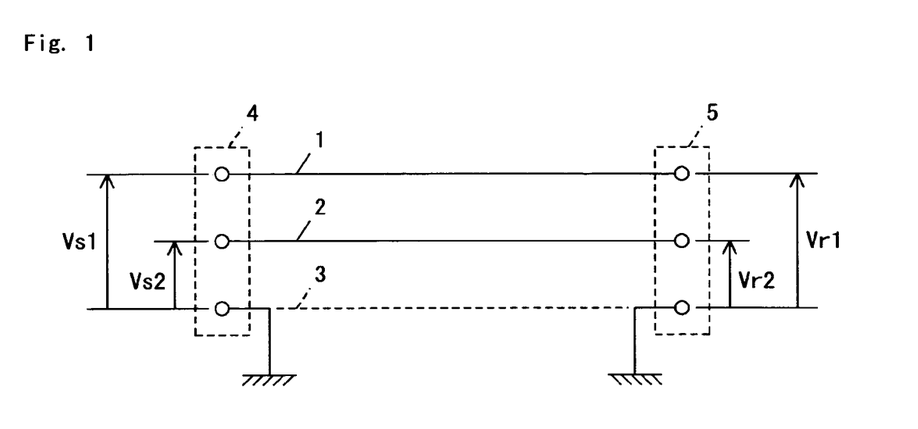
FIG. 1 is a descriptive illustration showing an LCL-measuring method according to the present invention.

FIG. 1 is a descriptive illustration showing an LCL-measuring method according to the present invention. In FIG. 1, a sending terminal 4 is connected to a receiving terminal 5 through interior-wired, first and second power lines 1, 2, and further through a virtual ground wire 3. The sending and receiving terminals 4, 5 represent, e.g., indoors equipped socket outlets that are provided at different places.

The LCL is a parameter indicative of the balancing of the power line with respect to the ground. When the first and second power lines 1, 2 are fully balanced with respect to the ground, then the LCL is equal to zero, or is a negative infinite in dB. However, in fact, the first and second power lines 1, 2 are unbalanced with respect to the ground. In addition, the balancing varies depending upon, e.g., where the socket outlets are located. The balancing is to be measured at the socket outlets.

As illustrated in FIG. 1, assume that a power line-to-ground potential of the first power line 1 at the sending terminal 4 and that of the second power line 2 thereat are Vs1 and Vs2, respectively. Assume that a power line-to-ground potential of the first power line 1 at the receiving terminal 5 and that of the second power line 2 thereat are Vr1 and Vr2, respectively.

Pursuant to the present invention, an LCL measured at the sending terminal 4 is designated as an LCL(s), while a further LCL measured at the receiving terminal 5 is designated as an LCL(r). The LCL(s) and LCL(r) are defined by "Equation 1" and "Equation 2" below, respectively.

$$LCL(s) = 20\log_{10}\left(\frac{1}{2}\frac{Vs1+Vs2}{Vs1-Vs2}\right) \quad \text{[Equation 1]}$$

$$LCL(r) = 20\log_{10}\left(\frac{1}{2}\frac{Vr1+Vr2}{Vr1-Vr2}\right) \quad \text{[Equation 2]}$$

In the description below, the LCL(s) and LCL(r) are sometimes collectively called the LCL.

First Embodiment

Figure 2:
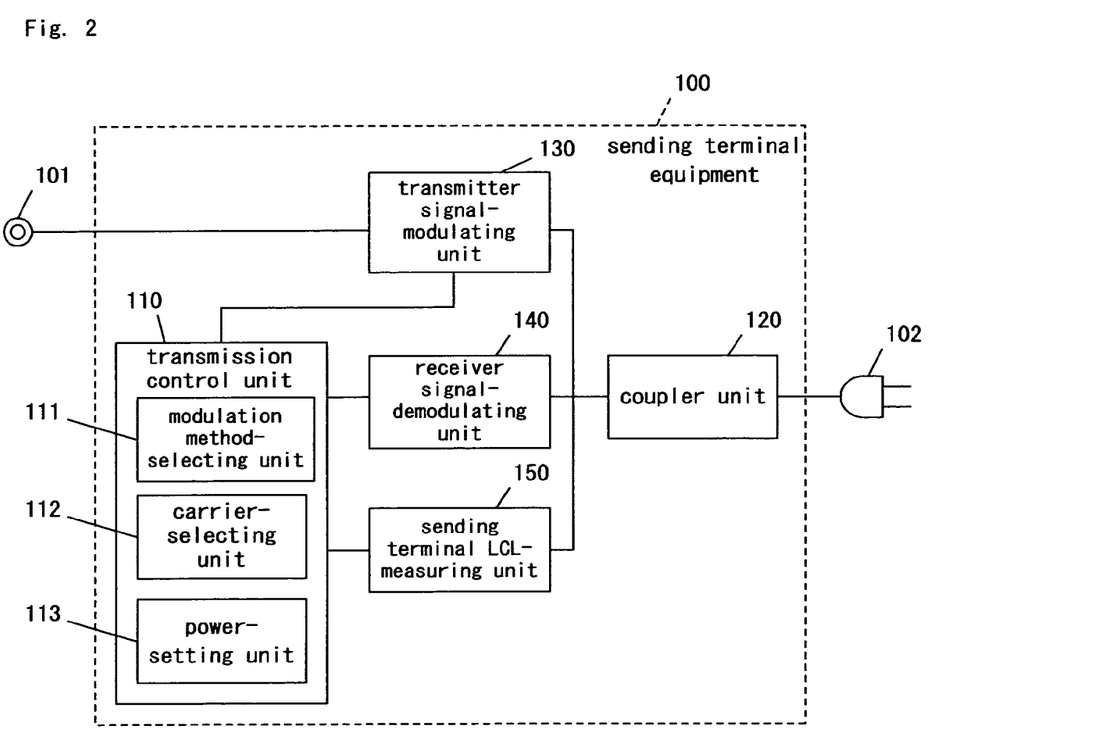
FIG. 2 is a block diagram illustrating sending terminal equipment according to a first embodiment of the present invention.

FIG. 2 is a block diagram illustrating sending terminal equipment 100 according to a first embodiment of the present invention.

The sending terminal equipment 100 for a multicarrier communication system according to the present embodiment includes a transmission control unit 110, a transmitter signal-modulating unit 130, a receiver signal-demodulating unit 140, a sending terminal LCL-measuring unit 150, and a coupler unit 120. The transmission control unit 110 includes a modulation method-selecting unit 111, a carrier-selecting unit 112, and a power-setting unit 113.

The coupler unit 120 connects the transmitter signal-modulating unit 130, receiver signal-demodulating unit 140, and sending terminal LCL-measuring unit 150 to a power line outlet (the first and second power lines 1, 2 at the sending terminal 4 in FIG. 1) through a plug 102.

The transmission control unit 110 is connected to the transmitter signal-modulating unit 130, the receiver signal-demodulating unit 140, and the sending terminal LCL-measuring unit 150 to control them. At the same time, the transmission control unit 110 controls its components, i.e., the modulation method-selecting unit 111, the carrier-selecting unit 112, and the power-setting unit 113.

The receiver signal-demodulating unit 140 works as a combination of SN ratio- and balancing-obtaining units.

The receiver signal-demodulating unit 140 and the carrier-selecting unit 112 share the function of a selection result-obtaining unit, i.e., a function of obtaining results from carrier selection in a second user's terminal, and a function of selecting carriers to be used for communication at a first user's terminal.

The sending terminal LCL-measuring unit 150 represents a balancing-measuring unit.

Figure 3:
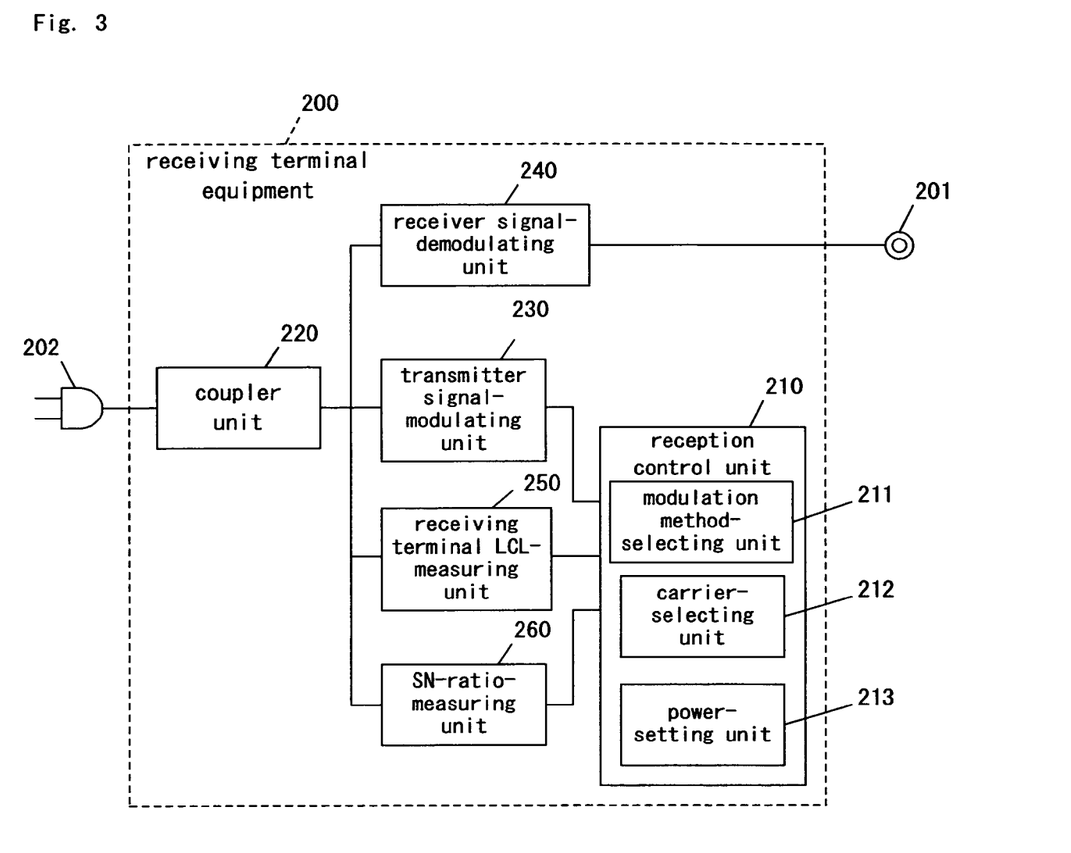
FIG. 3 is a block diagram illustrating receiving terminal equipment according to the first embodiment.

FIG. 3 is a block diagram illustrating the receiving terminal equipment 200 according to the first embodiment.

The receiving terminal equipment 200 for the multicarrier communication system according to the present embodiment includes a receiver signal-demodulating unit 240, a transmitter signal-modulating unit 230, a receiving terminal LCL-measuring unit 250, an SN-ratio-measuring unit 260, a reception control unit 210, and a coupler unit 220. The reception control unit 210 includes a modulation method-selecting unit 211, a carrier-selecting unit 212, and a power-setting unit 213.

The coupler unit 220 connects the receiver signal-demodulating unit 240, the transmitter signal-modulating unit 230, the receiving terminal LCL-measuring unit 250, and the SN-ratio-measuring unit 260 to a power line outlet (the first and second power lines 1, 2 at the receiving terminal 5 in FIG. 1) through a plug 202, thereby establishing a transmission line to the previously discussed sending terminal equipment 100.

The reception control unit 210 is connected to the transmitter signal-modulating unit 230, the receiving terminal LCL-measuring unit 250, and the SN-ratio-measuring unit 260 to control them. At the same time, the reception control unit 210 controls its components, i.e., the modulation method-selecting unit 211, the carrier-selecting unit 212, and the power-setting unit 213.

The reception control unit 210 and the transmitter signal-modulating unit 230 share respective functions of a selection result-notifying unit, an SN ratio-notifying unit, and a balancing-notifying unit. The selection result-notifying unit notifies the sending terminal equipment of results from selection in the carrier-selecting unit 212. The SN ratio-notifying unit notifies the sending terminal equipment of measured values from the SN-ratio-measuring unit 260. The balancing-notifying unit notifies the sending terminal equipment of measured values from the receiving terminal LCL-measuring unit 250.

The following discusses behaviors of the multicarrier communication system according to the present embodiment with reference to FIGS. 2 and 3.

Pursuant to the present embodiment, the sending terminal equipment 100 transmits SN-ratio-measuring signals from the transmitter signal-modulating unit 130 under the control of the transmission control unit 110. The SN-ratio-measuring signal is, e.g., a result from a process in which all carriers to be used are modulated using random data in accordance with a BPSK-modulation method. The SN-ratio-measuring signals are sequentially fed out of the sending terminal equipment 100.

The SN-ratio-measuring signals as just discussed above are received by the receiving terminal equipment 200. Thereafter, the SN-ratio-measuring unit 260 measures an SN-ratio of each carrier, thereby providing SN-ratio measurement values. The transmitter signal-modulating unit 230 transmits the SN-ratio measurement values to the sending terminal equipment 100 under the control of the reception control unit 210.

The sending terminal equipment 100 receives the carrier SN-ratio measurement values from the receiving terminal equipment 200 through the receiver signal-demodulating unit 140.

At the same time, the sending terminal LCL-measuring unit 150 measures, for each of the carriers, an LCL(s) as defined by "Equation 1", to provide LCL(s) measurement values. The LCL(s) measurement values are sent to the transmission control unit 110.

In the transmission control unit 110, the transmitted SN-ratio and LCL(s) measurement values of the carriers are used to allow the carrier-selecting unit 112 to select available carriers, to allow the modulation method-selecting unit 111 to decide on how the carriers to be used are modulated, and to allow the power-setting unit 113 to set transmission power to be applied to each of the carriers.

After the above process, the transmitter signal-modulating unit 130 permits transmission data entered into an input terminal 101 to be transmitted as multicarrier communication under the control of the transmission control unit 110.

Figure 5:
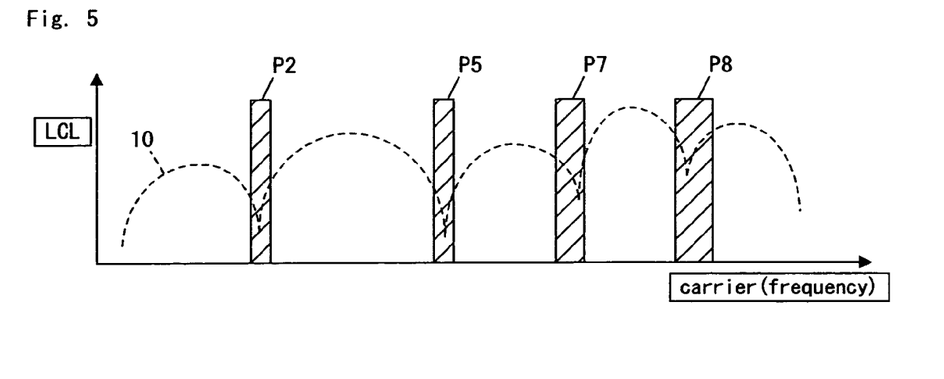
FIG. 5 is a descriptive illustration showing a carrier control-determining method according to the present invention (a relationship between an LCL and a carrier)

FIG. 5 is a descriptive illustration showing a carrier control-determining method according to the present invention (a relationship between an LCL and a carrier). FIG. 5 illustrates a relationship between the balancing parameter LCL and the carriers. In FIG. 5, for convenience of description, the vertical axis illustrates an LCL that becomes better (better balancing) with an increase in distance from the horizontal axis. For example, an LCL(s) or rather a sending terminal LCL measured by the sending terminal equipment 100 of FIG. 2 is illustrated by an LCL-envelope 10 of FIG. 5. According to the LCL-envelope 10 of FIG. 5, some carriers exhibit poor balancing (as illustrated by values near the horizontal axis in FIG. 5), with increased unwanted radiated emission.

In FIG. 5, domains P2, P5, P7, and P8 are poor in LCL, and carriers at these domains are unused by the carrier-selecting unit 112. Alternatively, the carriers at the same domains P2, P5, P7, and P8 are used but reduced in transmission power by the power-setting unit 113 in order to improve the LCL.

Figure 6A:
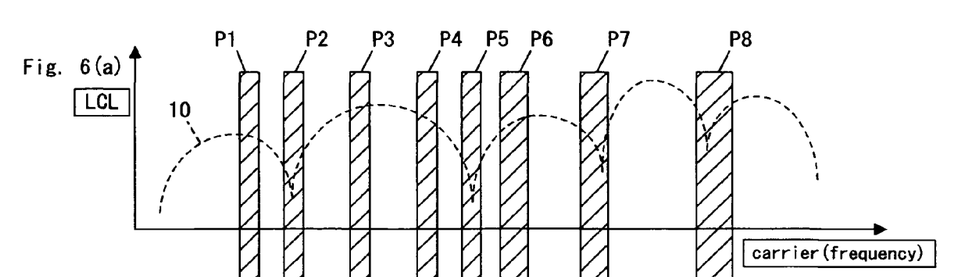
FIG. 6(a) is a descriptive illustration showing a carrier control-determining method according to the present invention (a relationship between an LCL and a carrier)
Figure 6B:
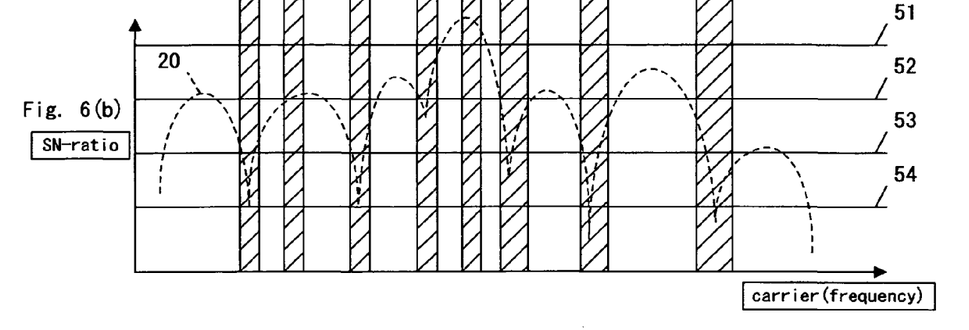
FIG. 6(b) is a descriptive illustration showing a carrier control-determining method according to the present invention (a relationship between an SN-ratio and a carrier)

FIG. 6($a$) is a descriptive illustration showing a carrier control-determining method according to the present invention (a relationship between an LCL and a carrier). FIG. 6($a$) is based on FIG. 5 as just described above. FIG. 6($b$) is a descriptive illustration showing a carrier control-determining method according to the present invention (a relationship between an SN-ratio and a carrier).

FIG. 6(b) illustrates a relationship between the SN-ratios and the carriers, in which a dotted line denotes an SN-ratio envelope 20. In FIG. 6(b), the horizontal axis is illustrated on the same scale as in FIG. 6(a). FIG. 6(b) also illustrates SN-ratio thresholds 51 to 54 that are required for modulation methods. As illustrated in FIG. 6(b), the SN-ratio envelope 20 also considerably varies depending upon the carriers.

Pursuant to the present embodiment, non-carrier-employing domains are determined based on only results from LCL measurement of FIG. 5 (more specifically, results from LCL (s) measurement), or alternatively, based on a combination of results from the LCL measurement of FIG. 5 and results from SN-ratio measurement of FIG. 6(b). In this way, available carriers are selected. In FIG. 6, hatched domains P1 to P8 denote the non-carrier-employing domains.

As discussed above, in FIG. 6, domains P2, P5, P7, and P8 are poor in LCL, and the carriers at these domains are unused by the carrier-selecting unit 112, or alternatively are used but reduced in transmission power by the power-setting unit 113.

In consideration of an LCL-based determination plus an SN ratio-based determination, the carriers are selected in a manner as discussed below. More specifically, in FIG. 6, domain P1 is bad in SN-ratio, but is good in LCL, and carriers at the domain P1 are inconvenient to communicate. As a result, the carrier-selecting unit 112 determines carriers at the domain P1 as non-available. The domains P2 and P5 are good in SN ratio, but are bad in LCL. As a result, it is determined that carriers at these domains are reduced in transmission power by the power-setting unit 113. Similarly, the domains P7 and P8 are bad in both SN ratio and LCL, and carriers at these domains are determined as non-available. The domain P4 is good in both SN ratio and LCL, and carriers at the domain P4 are determined as available as such.

As described above, pursuant to the present embodiment, the multicarrier communication system allows available carriers to be selected in accordance with SN-ratio measurement values measured by a receiving terminal or most common LCL measurement values measured by a sending terminal. As a result, a multicarrier communication system operable to suppress the occurrence of communication errors and to provide less unwanted radiated emission is achievable.

In the multicarrier communication system according to the present embodiment, the receiving terminal equipment 200 may optionally be free of the modulation method-selecting unit 211, the carrier-selecting unit 212, and the receiving terminal LCL-measuring unit 250.

Second Embodiment

Sending terminal equipment 100 and receiving terminal equipment 200 according to a second embodiment are the same as those of FIGS. 2 and 3. Therefore, the present embodiment is now described with reference to FIGS. 2 and 3.

An SN-ratio-measuring process according to the present embodiment is similar to that according to the previous embodiment, and descriptions related thereto are herein omitted.

Pursuant to the present embodiment, the receiving terminal equipment 200 measures a balancing parameter LCL. More specifically, the receiving terminal LCL-measuring unit 250 measures, for each carrier, an LCL(r) defined by "Equation 2", to provide an LCL(r) measurement value. The transmitter signal-modulating unit 230 transmits the LCL(r) measurement values to the sending terminal equipment 100 under the control of the reception control unit 210.

In the transmission control unit 110, the transmitted SN-ratio and LCL(r) measurement values of the carriers are used to allow the carrier-selecting unit 112 to select available carriers, and to allow the modulation method-selecting unit 111 to decide on how each of the carriers to be used is modulated.

After the above process, the transmitter signal-modulating unit 130 permits transmission data entered into the input terminal 101 to be transmitted as multicarrier communication under the control of the transmission control unit 110.

Pursuant to the present embodiment, available carriers are selected on the base of LCL measurement results (more specifically, LCL(r) measurement results) and SN-ratio measurement results. Such a carrier-selecting process is based on a process in which an LCL of FIG. 5 and that of FIG. 6(a) are replaced by the LCL(r). However, the others are the same as those of FIGS. 5 and 6, and therefore, descriptions related thereto are herein omitted.

Pursuant to the present embodiment, the carriers to be used are selected in accordance with the SN-ratio and LCL (more specifically, LCL(r)) measurement values measured by the receiving terminal equipment 200. As a result, a multicarrier communication system is achievable, which is designed to particularly operatively function in a transmission power line where there is much unwanted radiated emission near the receiving terminal 5.

In the multicarrier communication system according to the present embodiment, the sending terminal equipment 100 may optionally be free of the sending terminal LCL-measuring unit 150, while the receiving terminal equipment 200 may optionally be free of the modulation method-selecting unit 211 and the carrier-selecting unit 212.

Third Embodiment

Sending terminal equipment 100 and receiving terminal equipment 200 according to a third embodiment are the same as those of FIGS. 2 and 3. Therefore, the present embodiment is now described with reference to FIGS. 2 and 3.

In the sending terminal equipment 100, the transmitter signal-modulating unit 130 transmits SN-ratio-measuring signals under the control of the transmission control unit 110. The SN-ratio-measuring signal may be the same as, e.g., the signal according to the first embodiment.

The SN-ratio-measuring signals are received by the receiving terminal equipment 200. Thereafter, the SN-ratio-measuring unit 260 measures an SN-ratio of each carrier to provide an SN-ratio measurement value. The SN-ratio measurement values are sent to the reception control unit 210.

The receiving terminal equipment 200 measures an LCL. More specifically, the receiving terminal LCL-measuring unit 250 measures, for each of the carriers, an LCL(r) defined by "Equation 2", to provide an LCL(r) measurement value. The LCL (r) measurement values are sent to the reception control unit 210.

In the reception control unit 210, the SN-ratio measurement values measured by the SN-ratio-measuring unit 260 and the LCL(r) measurement values measured by the receiving terminal LCL-measuring unit 250 are used to allow the carrier-selecting unit 212 to select available carriers, to allow the power-setting unit 213 to set electrical power to be applied to the available carriers, and to allow the modulation method-selecting unit 211 to decide on how each of the carriers is modulated. The reception control unit 210 sends the determined information on the available carriers, carrier power-setting values, and modulation methods to the sending terminal equipment 100 through the transmitter signal-modulating unit 230.

In the sending terminal equipment 100, the transmitter signal-modulating unit 130 permits transmission data entered into the input terminal 101 to be transmitted as multicarrier communication, under the control of the transmission control unit 110, on the basis of the transmitted information on the available carriers, carrier power-setting values, and modulation methods.

Pursuant to the present embodiment, the receiving terminal equipment 200 measures the SN ratio and LCL, and further selects the carriers. As a result, what the receiving terminal equipment 200 must send to the sending terminal equipment 100 is, e.g., only numerals designated to the selected carriers, transmission power set values, and numerals indicative of the modulation methods. As a result, there are less data to be transmitted, and processing is completed quicker, which otherwise would be comparable to overhead processing in original data communication.

In addition, the receiving terminal equipment 200 measures the LCL. As a result, a multicarrier communication system is achievable, which is operative in a transmission power line where there is much unwanted radiated emission near the receiving terminal 5.

In the multicarrier communication system according to the present embodiment, the sending terminal equipment 100 may optionally be free of the modulation method-selecting unit 111, the carrier-selecting unit 112, and the sending terminal LCL-measuring unit 150.

Fourth Embodiment

Sending terminal equipment 100 and receiving terminal equipment 200 according to a fourth embodiment are the same as those of FIGS. 2 and 3, and the present embodiment is now described with reference to FIGS. 2 and 3.

An SN-ratio-measuring process according to the present embodiment is similar to that according to the first embodiment, and descriptions related thereto are herein omitted.

Pursuant to the present embodiment, the sending terminal equipment 100 and the receiving terminal equipment 200 measure LCLs. More specifically, the sending terminal LCL-measuring unit 150 measures, for each carrier, an LCL(s) defined by "Equation 1", thereby determining an LCL(s) measurement value. The determined LCL(s) measurement values are sent to the transmission control unit 110. An LCL(r) defined by "Equation 2", is measured by the receiving terminal LCL-measuring unit 250 for each of the carriers, thereby determining an LCL(r) measurement value. The transmitter signal-modulating unit 230 transmits the determined LCL(r) measurement values to the sending terminal equipment 100 under the control of the reception control unit 210.

In the sending terminal equipment 100, the receiver signal-demodulating unit 140 demodulates data on the LCL(r) upon receipt thereof from the receiving terminal equipment 200. The demodulated LCL(r) data is sent to the transmission control unit 110.

In the transmission control unit 110, the transmitted SN-ratio, LCL(s), and LCL(r) measurement values of carriers are used to allow the carrier-selecting unit 112 to select available carriers, to allow the power-setting unit 113 to set transmission power for carriers to be used, and to allow the modulation method-selecting unit 111 to decide on how each of the carriers to be used is modulated.

Referring now to FIG. 5, both carrier-selecting and power-setting processes according to the present embodiment are illustrated by the LCL envelope 10 representing the LCL(s) and LCL(r) together. More specifically, frequency domains in which either of the LCL(s) and LCL(r) measurement values are less than a predetermined LCL-threshold, and/or the SN ratio measurement values of FIG. 6(b) are less than a predetermined SN-ratio threshold are determined as non-carrier-employing domains by the carrier-selecting unit 112. As a result, the carrier-selecting unit 112 selects available carriers at the other domains.

After the above process, the transmitter signal-modulating unit 130 allows transmission data entered into the input terminal 101 to be transmitted as multicarrier communication under the control of the transmission control unit 110.

Pursuant to the present embodiment, the SN-ratio measurement values measured by the receiving terminal equipment 200 and the LCL measurement values measured by both of the sending terminal equipment 100 and the receiving terminal equipment 200 can be used to select available carriers in view of both of the balancing of a transmission power line when viewed from the sending terminal 4 and that when viewed from the receiving terminal 5. As a result, a multicarrier communication system is achievable, which is designed to operatively function under the condition in which unwanted radiated emission in the transmission power line is a particularly severe issue.

In the multicarrier communication system according to the present embodiment, the receiving terminal equipment 200 may optionally be free of the modulation method-selecting unit 211 and the carrier-selecting unit 212.

Fifth Embodiment

Sending terminal equipment 100 and receiving terminal equipment 200 according to a fifth embodiment are the same as those of FIGS. 2 and 3. An SN-ratio-measuring process according to the present embodiment is similar to that according to the first embodiment. A process of measuring a balancing parameter LCL can be either one of the LCL-measuring processes according to the first to fourth embodiments. Therefore, descriptions related thereto are herein omitted. The following description is made with reference to FIGS. 2 and 3.

The present embodiment is primarily characterized by the way in which selection of available carriers and selection of modulating methods are performed in either the transmission control unit 110 or the reception control unit 210. The following outlines such a feature with reference to FIG. 7 in accordance with a case in which the transmission control unit 110 selects available carriers and methods of modulating the carriers.

Figure 7:
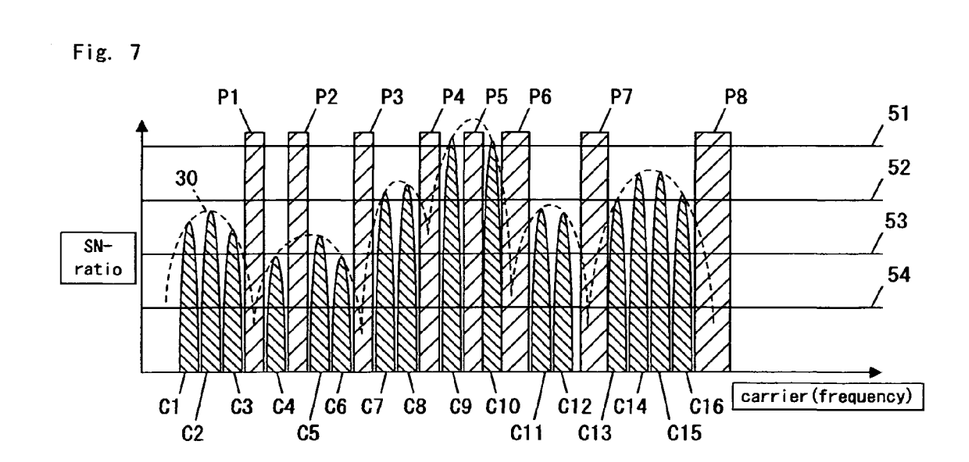
FIG. 7 is a descriptive illustration showing an available carrier-selecting method in accordance with a fifth embodiment.

FIG. 7 is a descriptive illustration showing an available carrier-selecting method according to the present embodiment. In FIG. 8, non-carrier-employing domains P1 to P8 are determined by the carrier-selecting unit 112 of FIG. 2 on the basis of, e.g., measurement data on the SN-ratio and LCL as illustrated in FIG. 6. In FIG. 7, available carriers C1 to C16 are illustrated in an easily viewable manner by being magnified in the direction of the horizontal axis for convenience of description. In fact, frequency bands occupied by the carriers are by much far smaller than those in FIG. 7, and a large number of carriers are provided therein.

As illustrated in FIG. 7, the carrier-selecting unit 112 of FIG. 2 initially determines the non-carrier-employing domains P1 to P8 on the basis of the measurement data on the SN-ratio and LCL. The carrier-selecting unit 112 then selects carriers C1 to C3 at a frequency domain lower than the non-carrier-employing domain P1. The carrier C4 is selected between the non-carrier-employing domains P1 and P2. The carriers C5 and C6 are selected between the non-carrier-employing domains P2 and P3. The remaining carriers up to the carrier C16 are similarly selected.

A first system according to the present embodiment takes account of the measured values of the SN-ratio and LCL in the above carrier selection, thereby determining available carriers in best-to-worst order of the measured values of the SN-ratio and LCL. In this instance, proper weight is added to the way of taking account of the values of the SN-ratio and LCL. For example, the LCL-values may be taken account of only when the non-carrier-employing domains are decided on, but may be ignored when the carrier-selecting sequence is decided on. This step represents a case where weight to the SN-ratio and weight to the LCL value are set to be 100% and 0%, respectively.

In this instance, the carrier-selecting unit 112 selects only a required number of carriers in the order of the carriers C9, C10, C15, C14, C16, and so on.

Subsequently, the modulation method-selecting unit 111 selects, for each of the selected carriers, a modulation method having the greatest multivalue permitted by the SN-ratio. More specifically, the modulation method-selecting unit 111 selects a 64QAM-modulation method for the carriers C9 and C10, and a 16QAM-modulation method for the carriers C15, C14, C16, C8, and C7. A proper modulation method is similarly selected for each of the remaining carriers.

The first system according to the present embodiment provides an efficient multicarrier communication system operable to make fully effective use of available frequency bands.

A second system according to the present embodiment determines carriers to be used, among available carriers, in highest-to-lowest order of carrier frequency in the above carrier selection. Such a determination method is based on an empirical fact in that lower frequency domains usually exhibits greater noises in a transmission power line, and consequently that the noises decrease with an increase in frequency.

In the example of FIG. 7, the carrier-selecting unit 112 of FIG. 2 determines the non-carrier-employing domains P1 to P8 in accordance with the measurement data on the SN-ratio and LCL. The carrier-selecting unit 112 then selects the carriers C16, C15, C14, C13, etc. in highest-to-lowest order of frequency. Thereafter, the modulation method-selecting unit 111 selects, for each of the selected carriers, a modulation method having the greatest multivalue.

The second system according to the present embodiment is possible to determine available carriers in accordance with simple algorism.

A third system according to the present embodiment pre-determines a first reference value (an LCL-related reference value) and a second reference value (an SN-ratio-related reference value) to compare them with the measured LCL and SN-ratio, respectively, thereby both selecting the carriers and controlling transmission power in accordance with four cases that follow:

(a) a carrier having an LCL equal to or greater than the first reference value and an SN-ratio equal to or greater the second reference value is used as such without a change in transmission power;

(b) a carrier having an LCL equal to or greater than the first reference value and an SN-ratio less than the second reference value is used after the transmission power is increased, or the carrier is excluded from the selection;

(c) a carrier having an LCL less than the first reference value and an SN-ratio equal to or greater the second reference value is used after the transmission power is decreased; or (d) a carrier having an LCL less than the first reference value and an SN-ratio less than the second reference value is non-used.

As discussed above, the third system according to the present embodiment provides fine control on the basis of measured values of the LCL and SN-ratio for each of the carriers to suppress unwanted radiated emission to the greatest possible extent, and to provide a maximum SN-ratio. As a result, environment-friendly and high-reliable multicarrier communication that takes account of the SN-ratio and unwanted radiated emission is achievable.

Sixth Embodiment

Figure 4:
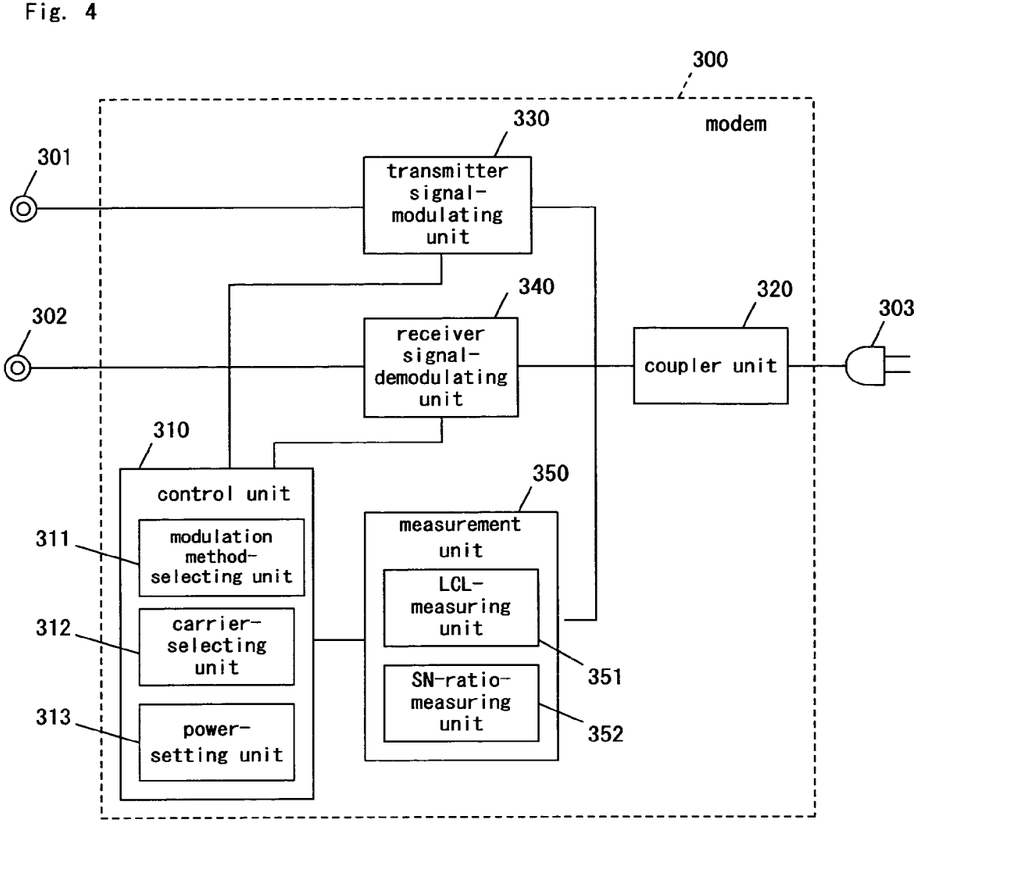
FIG. 4 is a block diagram illustrating a modem according to a sixth embodiment.

FIG. 4 is a block diagram illustrating a modem 300 according to a sixth embodiment. The modem 300 according to the present embodiment is an integration of the sending terminal equipment of FIG. 2 and the receiving terminal equipment of FIG. 3 according to the first embodiment.

As illustrated in FIG. 4, the modem 300 according to the present embodiment includes a control unit 310, a transmitter signal-modulating unit 330, a receiver signal-demodulating unit 340, a measurement unit 350, and a coupler unit 320. The control unit 310 includes a modulation method-selecting unit 311, a carrier-selecting unit 312, and a power-setting unit 313. The measurement unit 350 includes an LCL-measuring unit 351 and an SN-ratio-measuring unit 352.

When the modem 300 according to the present embodiment is operated as a transmitter, then the control unit 310 behaves in a manner similar to the transmission control unit 110 of FIG. 2. In addition, in the measurement unit 350, only the LCL-measuring unit 351 is operated to run in a manner similar to the sending terminal LCL-measuring unit 150 of FIG. 2. Furthermore, the receiver signal-demodulating unit 340 is operated in a manner similar to the receiver signal-demodulating unit 140 of FIG. 2.

When the modem 300 according to the present embodiment is operated as a receiver, then the control unit 310 is functioned in a manner similar to the reception control unit 210 of FIG. 3. In addition, in the measurement unit 350, the LCL-measuring unit 351 behaves in a manner similar to the receiving terminal LCL-measuring unit 250 of FIG. 3, while the SN-ratio-measuring unit 352 behaves similarly to the SN-ratio-measuring unit 260 of FIG. 3.

As described above, the modem 300 according to the present embodiment is usable as sending and receiving terminal equipment of a multicarrier communication apparatus. Accordingly, the modem 300 according to the present embodiment is possible to operate similarly to the first to fifth embodiments, and consequently provides similar features.

Although the present invention has been described in one operative method, there is another operative method, in embodying the present invention, in that the SN-ratio and LCL are measured at predetermined time intervals to subsequently renew the selection of available carriers and the selection of modulation methods.

It is also operative to use, as a balancing parameter, a longitudinal conversion transfer loss LCL(sr) as defined by "Equation 3" below.

$$LCL(sr) = 20\log_{10}\left(\frac{1}{2}\frac{Vr1 + Vr2}{Vs1 - Vs2}\right) \quad \text{[Equation 3]}$$

The LCL(sr) is also called a LCTL (longitudinal conversion transfer loss), and is given as a ratio of a balancing mode voltage ((Vr1+Vr2)/2 as illustrated in FIG. 1) at the receiving terminal 5 to an operation mode voltage (Vs1−Vs2 as illustrated in FIG. 1) at the sending terminal 4, thereby representing the balancing of the transmission line.

Pursuant to the above-described embodiments of the present invention, carrier control such as carrier selection, the set-up of transmission power to be applied to the selected carriers, and the selection of a method for modulating each one of the selected carriers is conducted for each of the carriers. Alternatively, a band to be used for multicarrier communication may be divided into sub-bands, each of which is, e.g., 1 MHz in bandwidth, thereby collectively controlling several carriers within each of the sub-bands. As a result, savings in steps and time required for the carrier control are realized, and a convenient and high-efficient multicarrier communication apparatus is attainable.

As described above, in a multicarrier communication system in which a balanced transmission line such as a power line is used as a transmission line, the present invention is primarily intended to determine available carriers in consideration of the balancing of the transmission line as well as an SN-ratio of the transmission line. Accordingly, the present invention may be susceptible to various modifications without departing from the sprit and scope of the present invention.

In the multicarrier communication system in which the balanced transmission line such as the power line is used as the transmission line, the present invention is possible to both set transmission power and select a modulation method for each of the carriers to be used, in consideration of the balancing of the transmission line as well as the SN-ratio of the transmission line. As a result, a high-efficient multicarrier communication method and system is provided, which is operable to select a greater number of carriers and modulation method having greater multivalues, and further to suppress unwanted radiated emission from the transmission line.

The multicarrier communication method and system according to the present invention as well as communication apparatuses incorporated therein are applicable in the application field of, e.g., power-line communications in general households.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A multicarrier communication method using a balanced transmission line that interconnects sending terminal equipment and receiving terminal equipment, the multicarrier communication method comprising:
    measuring a balancing and an SN-ratio of the balanced transmission line; and
    controlling a communication mode in accordance with the measured balancing and the measured SN-ratio of the balanced transmission line,
    wherein the controlling of the communication mode includes controlling transmitting power for carriers to be used in a communication in accordance with the measured balancing and the measured SN-ratio of the balanced transmission line,
    the controlling of the communication mode includes comparing the measured balancing and the measured SN-ratio with predetermined first and second reference values, respectively, the first reference value being a balancing-related reference value and the second reference value being an SN-ratio-related reference value, and
    wherein (a) a carrier having balancing equal to or greater than the first reference value and an SN-ratio equal to or greater than the second reference value is used without a change in transmitting power for the carrier; (b) a carrier having balancing equal to or greater than the first reference value and an SN-ratio less than the second reference value is used with an increase in transmitting power for the carrier or excluded from the communication; (c) a carrier having balancing less than the first reference value and an SN-ratio equal to or greater than the second reference value is used with a decrease in transmitting power for the carrier; and (d) a carrier having balancing less than the first reference value and an SN-ratio less than the second reference value is excluded from communication.

2. A multicarrier communication method as defined in claim 1, wherein the controlling of the communication mode includes selecting carriers to be used in the communication in accordance with the measured balancing that has been obtained by the measuring of the balancing of the balanced transmission line.

3. A multicarrier communication method as defined in claim 1, wherein the controlling of the communication mode includes selecting carriers to be used in the communication in accordance with the measured balancing and the measured SN-ratio, the measured balancing and the measured SN-ratio having been obtained by the measuring of the balancing and the SN-ratio of the balanced transmission line.

4. A multicarrier communication method as defined in claim 3, wherein the controlling of the communication mode includes excluding from the communication, any carrier having an SN-ratio less than the predetermined second reference value, in accordance with the measured SN-ratio that has been obtained by the measuring of the balancing and the SN-ratio of the balanced transmission line.

5. A multicarrier communication method as defined in claim 3, wherein the controlling of the communication mode includes selecting the carriers in a highest-to-lowest order of frequency.

6. A multicarrier communication method as defined in claim 2, wherein the controlling of the communication mode includes allowing the sending terminal equipment to select the carriers to be used in the communication.

7. A multicarrier communication method as defined in claim 3, wherein the controlling of the communication mode includes allowing the receiving terminal equipment to select the carriers to be used in communication, and to notify the sending terminal equipment of results from selection of the carriers.

8. A multicarrier communication method as defined in claim 3, wherein the controlling of the communication mode includes selecting a modulation method for each of the carriers in accordance with the measured SN-ratio that has been obtained by the measuring of the balancing and the SN-ratio of the balanced transmission line.

9. A multicarrier communication method as defused in claim 3, wherein the measuring of the balancing and the SN-ratio is performed at predetermined time intervals, and wherein the controlling of the communication mode includes selecting new carriers to be used in the communication each time when the measuring of the balancing and the SN-ratio is performed.

10. A multicarrier communication method as defined in claim 1, wherein the controlling of the communication mode includes both selection of carriers to be used in communication and control over transmitting power for the carriers in accordance with the measured balancing and the measured SN-ratio, the measured balancing and the measured SN-ratio having been obtained by the measuring of the balancing and the SN-ratio of the balanced transmission line.

11. A multicarrier communication method as defined in claim 1, wherein the first reference value is determined in accordance with radiated emission in the balanced transmission line, and the second reference value is determined in accordance with a modulation method-based bit error rate.

12. A multicarrier communication method as defined in claim 11, wherein the controlling of the communication mode includes collectively performing, for several carriers divided for each band, at least one of selection of the carriers and control over transmitting power for the carriers.

13. A multicarrier communication method as defined in claim 1, wherein the measuring of the balancing of the balanced transmission line includes allowing at least one of the sending terminal equipment and the receiving terminal equipment to measure the balancing.

14. A multicarrier communication method as defined in claim 1, wherein the measuring of the balancing and the SN-ratio of the balanced transmission line includes allowing at least one of the sending terminal equipment and the receiving terminal equipment to measure the balancing, and allowing the receiving terminal equipment to measure the SN-ratio.

15. A multicarrier communication method as defined in claim 1, wherein the measuring of the balancing of the balanced transmission line includes measuring at least one of longitudinal conversion loss and longitudinal conversion transfer loss as a parameter indicative of the balancing.

16. A multicarrier communication apparatus operable to provide multicarrier communication between a first user's terminal and a second user's terminal through a balanced transmission line, the multicarrier communication apparatus comprising:
   a measurement unit operable to measure a balancing and an SN-ratio of the balanced transmission line; and
   a controller operable to control a communication mode in accordance with the measured balancing and the measured SN-ratio obtained by the measurement unit,
   wherein the controller includes a control unit operable to control transmitting power for carriers to be used in a communication in accordance with the measured balancing and the measured SN-ratio obtained by the measurement unit,
   the controller comparing the measured balancing and the measured SN-ratio with predetermined first and second reference values, respectively, the first reference value being a balancing-related reference value and the second reference value being an SN-ratio-related reference value, and
   wherein (a) a carrier having balancing equal to or greater than the first reference value and an SN-ratio equal to or greater than the second reference value is used without a change in transmitting power for the carrier; (b) a carrier having balancing equal to or greater than the first reference value and an SN-ratio less than the second reference value is used with an increase in transmitting power for the carrier or excluded from the communication; (c) a carrier having balancing less than the first reference value and an SN-ratio equal to or greater than the second reference value is used with a decrease in transmitting power for the carrier; and (d) a carrier having balancing less than the first reference value and an SN-ratio less than the second reference value is excluded from the communication.

17. A multicarrier communication apparatus as defined in claim 16, further comprising:
   a balancing-measuring unit operable to measure the balancing of the balanced transmission line.

18. A multicarrier communication apparatus as defined in claim 16, further comprising:
   a balancing-measuring unit operable to measure the balancing of the balanced transmission line; and
   a balancing-notifying unit operable to notify the second user's terminal of a measured value of the balancing.

19. A multicarrier communication apparatus as defined in claim 16, further comprising:
   a balancing-obtaining unit operable to obtain a measured value of the balancing notified by the second user's terminal.

20. A multicarrier communication apparatus as defined in claim 16, further comprising:
   an SN-ratio-measuring unit operable to measure the SN-ratio of the balanced transmission line.

21. A multicarrier communication apparatus as defined in claim 16, further comprising:
   an SN-ratio-measuring unit operable to measure the SN-ratio of the balanced transmission line; and
   an SN-ratio-notifying unit operable to notify the second user's terminal of a measured value of the SN-ratio.

22. A multicarrier communication apparatus as defined in claim 16, further comprising:
   an SN-ratio-obtaining unit operable to obtain a measured value of the SN-ratio notified by the second user's terminal.

23. A multicarrier communication apparatus as defined in claim 16, further comprising: a selection result-obtaining unit operable to select carriers to be used for communication at the first user's terminal.

24. A multicarrier communication apparatus as defined in claim 16, further comprising:
   a modulation method-selecting unit operable to select an available modulation method for each of the carriers in accordance with the balancing and SN-ratio of the balanced transmission line.

25. A multicarrier communication apparatus as defined in claim 16, further comprising:
   a power-setting unit operable to set transmitting power for the carriers in accordance with the balancing and SN-ratio of the balanced transmission line.

26. A multicarrier communication apparatus as defined in claim 16, wherein one of longitudinal conversion loss and longitudinal conversion transfer loss is employed as a parameter indicative of the balancing.

27. A modem operable to provide multicarrier communication between a first user's terminal and a second user's terminal through a balanced transmission line, the modem comprising:
   a measurement unit operable to measure a balancing and an SN-ratio of the balanced transmission line; and a controller operable to control a communication mode in accordance with the measured balancing and the measured SN-ratio obtained by the measurement unit, wherein the controller includes a control unit operable to control transmitting power for carriers to be used in a communication in accordance with the measured balancing and the measured SN-ratio obtained by the measurement unit, the controller comparing the measured balancing and the measured SN-ratio with predetermined first and second reference values, respectively, the first reference value being a balancing-related reference value and the second reference value being an SN-ratio-related reference value, and wherein (a) a carrier having balancing equal to or greater than the first reference value and an SN-ratio equal to or greater than the second reference value is used without a change in transmitting power for the carrier; (b) a carrier having balancing equal to or greater than the first reference value and an SN-ratio less than the second reference value is used with an increase in transmitting power for the carrier or excluded from the communication; (c) a carrier having balancing less than the first reference value and an SN-ratio equal to or greater than the second reference value is used with a decrease in transmitting power for the carrier; and (d) a carrier having balancing less than the first reference value and an SN-ratio less than the second reference value is excluded from the communication.

28. A multicarrier communication system using a balanced transmission line, the multicarrier communication system comprising:

a measurement unit operable to measure a balancing and an SN-ratio of the balanced transmission line; and a controller operable to control a communication mode in accordance with the measured balancing and the measured SN-ratio obtained by the measurement unit, wherein the controller includes a control unit operable to control transmitting power for carriers to be used in a communication in accordance with the measured balancing and the measured SN-ratio obtained by the measurement unit, the controller comparing the measured balancing and the measured SN-ratio with predetermined first and second reference values, respectively, the first reference value being a balancing-related reference value and the second reference value being an SN-ratio-related reference value, and wherein (a) a carrier having balancing equal to or greater than the first reference value and an SN-ratio equal to or greater than the second reference value is used without a change in transmitting power for the carrier; (b) a carrier having balancing equal to or greater than the first reference value and an SN-ratio less than the second reference value is used with an increase in transmitting power for the carrier or excluded from the communication; (c) a carrier having balancing less than the first reference value and an SN-ratio equal to or greater than the second reference value is used with a decrease in transmitting power for the carrier; and (d) a carrier having balancing less than the first referencing value and an SN-ratio less than the second reference value is excluded from the communication.

29. A multicarrier communication system as defined in claim 28, wherein one of longitudinal conversion loss and longitudinal conversion transfer loss is employed as a parameter indicative of the balancing.

* * * * *